US009588608B2

(12) United States Patent
Hecht et al.

(10) Patent No.: US 9,588,608 B2
(45) Date of Patent: Mar. 7, 2017

(54) ADA ENABLED TOUCH SCREEN INTERFACE FOR A BEVERAGE DISPENSING MACHINE

(71) Applicant: Automatic Bar Controls, Inc., Vacaville, CA (US)

(72) Inventors: Thomas R. Hecht, Winters, CA (US); Richard A. Martindale, Vacaville, CA (US)

(73) Assignee: Automatic Bar Controls, Inc., Vacaville, CA (US)

(*) Notice: Subject to any disclaimer, the term of this patent is extended or adjusted under 35 U.S.C. 154(b) by 1 day.

(21) Appl. No.: 14/331,122

(22) Filed: Jul. 14, 2014

(65) Prior Publication Data

US 2014/0326754 A1   Nov. 6, 2014

Related U.S. Application Data

(63) Continuation-in-part of application No. 13/168,875, filed on Jun. 24, 2011, which is a continuation-in-part
(Continued)

(51) Int. Cl.
*B67D 7/74* (2010.01)
*G06F 3/041* (2006.01)
(Continued)

(52) U.S. Cl.
CPC .............. *G06F 3/041* (2013.01); *A47J 31/52* (2013.01); *B67D 1/0888* (2013.01);
(Continued)

(58) Field of Classification Search
CPC .. B67D 1/0888; B67D 1/0036; B67D 1/0057; B67D 1/0081; B67D 1/0872;
(Continued)

(56) References Cited

U.S. PATENT DOCUMENTS 3,664,550 A   5/1972  Carothers et al.
4,619,378 A   10/1986 de Man
(Continued)

FOREIGN PATENT DOCUMENTS

EP    0 989 091 A1   3/2000
EP    1 955 977 A1   8/2008
(Continued)

OTHER PUBLICATIONS

Great Britain Search Report mailed on Mar. 9, 2010 for GB Patent Application No. GB0919683.3, 4 pages.
(Continued)

*Primary Examiner* — Patrick M Buechner
(74) *Attorney, Agent, or Firm* — Kilpatrick Townsend & Stockton LLP (57) ABSTRACT

An ADA accessible beverage dispenser having a touch screen for receiving input for controlling the beverage dispenser and a first ADA access panel located within the reach of a user for receiving input from a user and a second ADA access panel displayed in a lower portion of the touchscreen and within the reach of the user for receiving input from the user where the first and second ADA access panels are configured to communicate with the beverage dispenser to control the beverage dispenser.

12 Claims, 6 Drawing Sheets

Related U.S. Application Data of application No. 12/611,788, filed on Nov. 3, 2009, now abandoned.

(60) Provisional application No. 61/358,858, filed on Jun. 25, 2010, provisional application No. 61/113,183, filed on Nov. 10, 2008.

(51) Int. Cl.
| | |
|---|---|
| *B67D 1/08* | (2006.01) |
| *A47J 31/52* | (2006.01) |
| *G07F 13/06* | (2006.01) |
| *B67D 1/16* | (2006.01) |
| *B67D 1/00* | (2006.01) |
| *B67D 1/12* | (2006.01) |

(52) U.S. Cl.
CPC .......... *G07F 13/065* (2013.01); *B67D 1/0036* (2013.01); *B67D 1/0057* (2013.01); *B67D 1/0081* (2013.01); *B67D 1/0872* (2013.01); *B67D 1/0895* (2013.01); *B67D 1/1202* (2013.01); *B67D 1/1204* (2013.01); *B67D 1/1209* (2013.01); *B67D 1/16* (2013.01); *B67D 2210/00031* (2013.01); *B67D 2210/00091* (2013.01)

(58) Field of Classification Search
CPC .. B67D 1/0895; B67D 1/1202; B67D 1/1204; B67D 1/1209; B67D 1/16; B67D 2210/00031; B67D 2210/00091; A47J 31/52; G07F 13/065
USPC ......... 222/1, 52, 129.1, 129.4; 700/231, 240
See application file for complete search history.

(56) References Cited

U.S. PATENT DOCUMENTS

| | | | |
|---|---|---|---|
| 4,979,639 A | 12/1990 | Hoover et al. | |
| 5,027,284 A | 6/1991 | Senghaas et al. | |
| 5,033,651 A | 7/1991 | Whigham et al. | |
| 5,836,481 A | 11/1998 | Strohmeyer et al. | |
| 6,039,219 A | 3/2000 | Bach et al. | |
| 6,369,721 B1 | 4/2002 | Yang et al. | |
| 6,573,884 B1* | 6/2003 | Kinzie ........................... 345/156 | |
| 6,698,621 B2 | 3/2004 | Landers et al. | |
| 6,892,762 B2 | 5/2005 | Porter et al. | |
| 7,658,006 B2 | 2/2010 | Schroeder | |
| 7,872,201 B1 | 1/2011 | Whitney | |
| 8,442,674 B2 | 5/2013 | Tilton et al. | |
| 2003/0098317 A1 | 5/2003 | McGuggey | |
| 2003/0208299 A1 | 11/2003 | Sudolcan et al. | |
| 2004/0118872 A1 | 6/2004 | Romanyszyn et al. | |
| 2005/0115989 A1 | 6/2005 | Ludovissie et al. | |
| 2006/0118581 A1 | 6/2006 | Clark | |
| 2006/0151529 A1* | 7/2006 | Crisp, III ................... 222/129.1 | |
| 2007/0029005 A1 | 2/2007 | Huang et al. | |
| 2008/0029541 A1* | 2/2008 | Wallace .............. B01F 13/1055 222/129.3 | |
| 2008/0037232 A1 | 2/2008 | Schroetlin | |
| 2009/0070234 A1 | 3/2009 | Peters et al. | |
| 2010/0116842 A1 | 5/2010 | Hecht et al. | |
| 2011/0017776 A1 | 1/2011 | Metropulos et al. | |
| 2011/0088568 A1* | 4/2011 | Farrell .................... A23G 9/045 99/460 | |
| 2011/0315711 A1 | 12/2011 | Hecht et al. | |
| 2012/0055954 A1 | 3/2012 | Hecht | |
| 2014/0188271 A1* | 7/2014 | Hernandez .......... B67D 1/0888 700/232 | |

FOREIGN PATENT DOCUMENTS

| | | |
|---|---|---|
| GB | 2 442 223 A | 4/2008 |
| JP | 2003-026293 A | 1/2003 |
| JP | 2003-160196 A | 6/2003 |
| KR | 10-0135467 B1 | 1/1998 |
| KR | 10-2001-0029306 A | 4/2001 |
| KR | 20-2009-0004052 A | 4/2009 |
| WO | 92/08671 A1 | 5/1992 |
| WO | 98/46519 A1 | 10/1998 |
| WO | 2004/014781 A2 | 2/2004 |
| WO | 2004/030438 A2 | 4/2004 |
| WO | 2006/058692 A1 | 6/2006 |
| WO | 2008/082394 A1 | 7/2008 |
| WO | 2009/032686 A1 | 3/2009 |
| WO | 2011/011690 A1 | 1/2011 |

OTHER PUBLICATIONS

Great Britain Search Report mailed on May 27, 2010 for GB Patent Application No. GB0919683.3, 3 pages.
International Search Report and Written Opinion of the International Searching Authority mailed on Feb. 9, 2012 for PCT Patent Application No. PCT/US2011/042053, 13 pages.
Non-Final Office Action mailed on Jul. 31, 2012 for U.S. Appl. No. 12/611,788, 11 pages.
Great Britain Office Action mailed on Oct. 9, 2012 for GB Patent Application No. GB0919683.3, 5 pages.
International Preliminary Report on Patentability mailed on Jan. 10, 2013, for PCT Patent Application No. PCT/US2011/042053, 10 pages.
International Search Report and Written Opinion of the International Searching Authority mailed on Jan. 30, 2013 for PCT Patent Application No. PCT/US2012/052697, 9 pages.
Final Office Action mailed on Apr. 17, 2013, for U.S. Appl. No. 12/611,788, 12 pages.
Great Britain Examination Report mailed on Jun. 3, 2013, for GB Patent Application No. GB0919683.3, 2 pages.
Non-Final Office Action mailed on Aug. 21, 2013, for U.S. Appl. No. 13/168,875, 10 pages.
Non-Final Office Action mailed on Sep. 13, 2013, for U.S. Appl. No. 12/611,788, 13 pages.
Great Britain Notification of Grant mailed on Sep. 17, 2013, for GB Patent Application No. GB0919683.3, 2 pages.
Non-Final Office Action mailed on Dec. 6, 2013, for U.S. Appl. No. 13/220,546, 9 pages.
International Preliminary Report on Patentability mailed on Mar. 13, 2014, for PCT Patent Application No. PCT/US2012/052697, 6 pages.
Final Office Action mailed Mar. 21, 2014, for U.S. Appl. No. 12/611,788 (15 pages).
Office Action mailed May 1, 2014, for U.S. Appl. No. 13/168,875, 14 pages.
Extended European Search Report mailed Jun. 3, 2014, from European Application No. 11799055.6 (6 pages).
Office Action mailed Mar. 24, 2015, for U.S. Appl. No. 13/168,875, 13 pages.

\* cited by examiner

ADA ENABLED TOUCH SCREEN INTERFACE FOR A BEVERAGE DISPENSING MACHINE

CROSS-REFERENCE TO RELATED APPLICATIONS

This application is a continuation-in-part of U.S. application Ser. No. 13/168,875, filed Jun. 24, 2011, which claims the benefit of U.S. Provisional Application No. 61/358,858, filed Jun. 25, 2010, and is a continuation-in-part of U.S. application Ser. No. 12/611,788, filed Nov. 3, 2009, which claims the benefit of U.S. Provisional Application No. 61/113,183, filed Nov. 10, 2008, the entireties of all incorporated by reference herein.

BACKGROUND

A number of beverage dispenser designs are well known in the art. These include carbonated beverage dispensers, non-carbonated beverage dispensers, beverage brewing systems, and liquor distribution systems. Many beverage dispenser designs have separate nozzles to pour (dispense) different beverages. Some beverage dispensers are capable of dispensing a variety of beverages out of a single nozzle.

Some of these beverage dispensers sometimes have an interface device (e.g., a key pad) for the selection of options such as cup size or beverage. Such an interface device is usually designed with appropriate beverage options for a particular establishment (e.g., a restaurant) and has a set number of keys. Prior to installation, the keys on the interface device are assigned to dispense the particular beverages chosen for that establishment.

Touch screens have been utilized to control the dispensing of beverages from these systems in lieu of key pad input interfaces. Touch screens have vastly increased the customizability and ease of use of the beverage dispensing devices described above, however, sometimes the touch screens can be less than ideal. Sometimes the touch screens are placed in areas where it is difficult for disabled users to reach a portion or all of the touch screen, but this location may be more ideal for other users. When providing a regular touchscreen beverage dispensing unit, establishments may have to make alternative accommodations to disabled persons to meet American Disabilities Act requirements and so disabled persons can use the dispenser.

Accordingly, it is desirable to develop a beverage dispensing device that also has accessible features for manipulation of the touch screen making it easier for all users, including disabled, to operate the beverage dispensing system.

BRIEF SUMMARY

The present invention is related to beverage dispensing ADA accessibility features, and more specifically to an operational input interface located within accessible reach of disabled user for controlling a touch screen user interface so that both disabled and non-disable user can utilize the ease of operation a beverage dispensing system with a touch screen interface for dispensing a beverage.

The invention enables touch screen operation while ensuring applicable food safety requirements and access requirements of the ADA are met by including an additional user input control on the base of the beverage dispenser that supports a display device real time operational input interface compliant with ADA access requirements. Buttons located within a key pad allow parallel input means (e.g. via additional touch screen or buttons) to navigate: up, down, left, right select or dispense, for user input for dispensing a beverage.

In some embodiments an ADA accessible beverage dispenser has a touch screen for receiving input for controlling the beverage dispenser; and an ADA access panel located within the reach of a user for receiving input from an ADA user where the ADA access panel is configured to communicate with the beverage dispenser to control the beverage dispenser.

In some aspects, the ADA access panel is located in a lower portion of the touchscreen. In some aspects, the ADA access panel is a key pad located separate from the touch screen. In some embodiments, the ADA accessible beverage dispenser also has a base for mounting the touch screen and the key pad is located on the base. In some aspects the base has a front that faces a user of the beverage dispenser and the key pad is located on the front of the base.

In some embodiments, the ADA access panel is comprised of one or more buttons. The one or more buttons can be a right toggle button, a left toggle button and a selector button. The one or more buttons can further comprise a beverage dispensing button. In some aspects, the key pad is a second touch screen. In some embodiments, the ADA access panel is a key pad located separate from the touch screen and a second ADA access panel is displayed in a lower portion of the touchscreen simultaneously.

In some embodiments a control system for a beverage dispenser with touch screen user interface has a touch screen attached to the beverage dispensing end for receiving input for controlling the beverage dispenser, an ADA access panel located within the reach of a user for receiving input from a user and a control unit electrically coupled to the ADA accessible panel. The control unit is configured to send a first graphical configuration to the touch screen for display, receive a first command from the touch screen or the ADA accessible panel, send a second graphical configuration to the touch screen for display in response to the first command, receive a second command from the touch screen or ADA accessible panel with respect to the second graphical configuration and control the beverage dispenser in response to the second command.

In some aspects the first command is derived from receiving a user touch on the ADA accessible panel. In some aspects the second command is derived from receiving a user selection of one of the selectable beverage choices from the ADA accessible panel. In some aspects, the control unit is configured to receive input from various sources.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION

The embodiments described herein provide ADA enabled touch screen controls for beverage dispensers. Beverage dispensers, which allow an operator to dispense a number of different beverages by merely pressing an appropriate button on the dispenser, have been around for many years. One exemplary beverage dispensing tower is described in Assignees patent application, U.S. Application No. US2011/0315711 A1 to Hecht, to which this application claims priority and the entirety of which is incorporated herein by reference. Other similar beverage dispensing devices are commercially available from Automatic Bar Controls at www.wunderbar.com.

Embodiments of the present invention may provide one or more of advantages including a more marketable product, increased revenue from sales, and/or reduced inventory. For example, an ADA enabled touch screen beverage dispenser conforms with mandated ADA requirements, when installed properly. An ADA enable touch screen beverage dispenser may reduce inventory and costs for an establishment as it may avoid multiple machines or other costly aftermarket adaptations for meeting the ADA requirements. The ADA enable touch screen beverage dispenser may also have a wider market appeal as simply being accessible to disabled persons, thus allowing a greater number of users to utilize the beverage dispensing machine.

Certain embodiments described herein may provide one or more of the above advantages. One or more other advantages may be readily apparent to one skilled in the art from the disclosure.

Touch Screen Control Beverage Dispensers

Figures 1A, 1B:
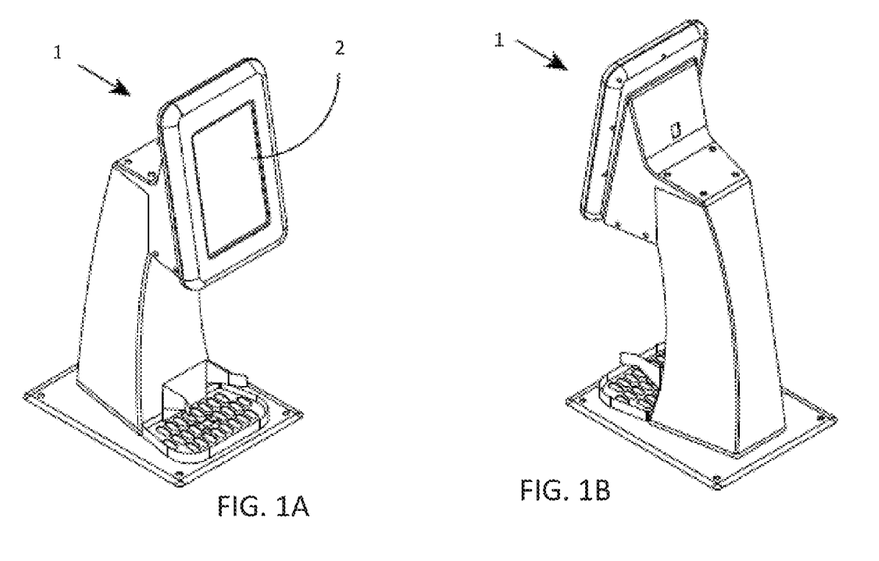
FIGS. 1A and 1B illustrate front and rear perspective views, respectively, of a remote beverage tower with a touch screen interface, that can be integrated with an ADA enabled touch screen interface.
Figure 1C:
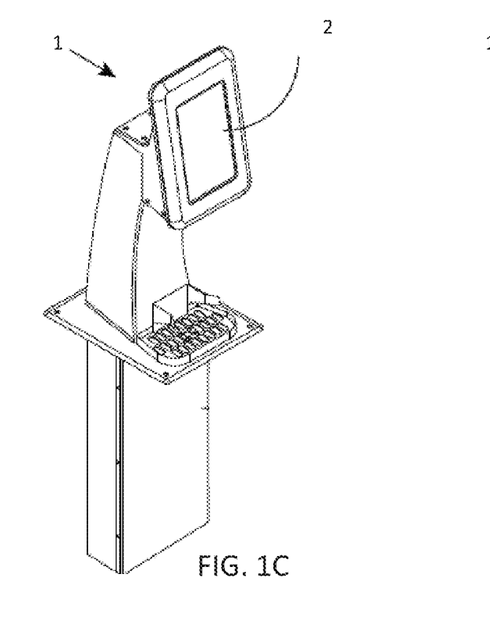
FIGS. 1C and 1D illustrate front and rear perspective views, respectively, of an integrated beverage tower with a touch screen interface that can be integrated with an ADA enabled touch screen interface.
Figure 1D:
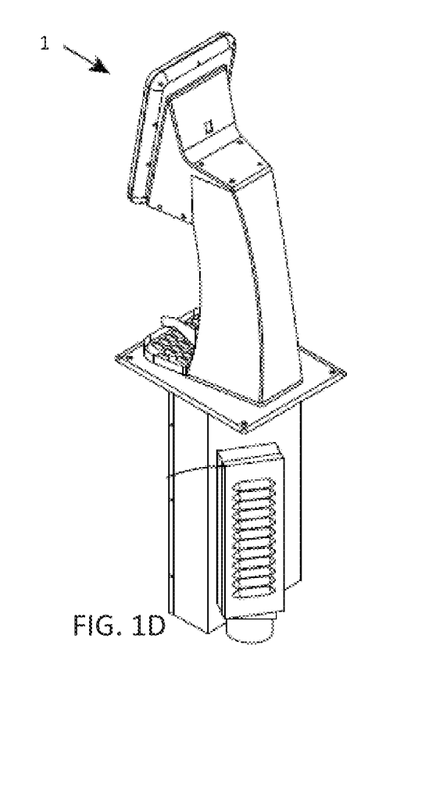

FIGS. 1A-1D illustrate views of beverage dispensers, according to Assignee's prior application, U.S. Publication No. US2011/0315711 A1 to Hecht, identified above. This beverage dispenser can be made ADA enabled when utilizing the features of the present invention. The beverage dispensers may have remote towers, as shown in FIGS. 1A and 1B, which are separated from a plurality of beverage dispensing valves. Alternatively, the beverage dispensers may have integrated towers, as shown in FIGS. 1C and 1D, which share a common greater housing with a plurality of beverage dispensing valves.

The beverage dispensers 1 include touch screens 2 for use as control panels. The touch screens 2 are modularly compatible with the beverage dispensing systems. For example, these touch screens 2 can be used in lieu of or in conjunction with other types of control panels. These touch screens 2 can be electrically coupled to a controller 26 (shown in FIG. 3), to provide user inputs thereto.

Many different types of touch screens 2 may be used in accordance with the embodiments described herein. Some examples of touch screens 2 include resistive, capacitive, surface acoustic wave, infrared, strain gage (i.e., force panel), optical, dispersive signal, acoustic pulse, and coded LCD. Touch screens 2 are generally attached to a beverage dispenser housing as shown. Generally, the touch screens 2 should be compatible with a food serving environment and be resistant to liquids and common kitchen cleaning chemicals.

ADA Requirements

Figure 2:
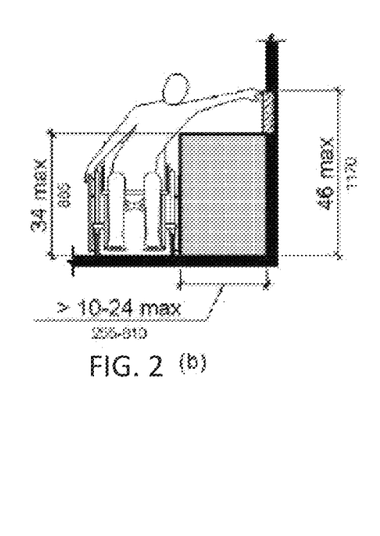
FIGS. 2(a)-2(b) shows ADA requirements for the placement of accessible items to disabled person depending on the height and width of a particular countertop or surface.
FIG. 2(c) shows a typical arrangement for a touch screen on a beverage dispensing tower installed on a 34 inch countertop or surface and one way to meet ADA-requirements.
Figure 2C:
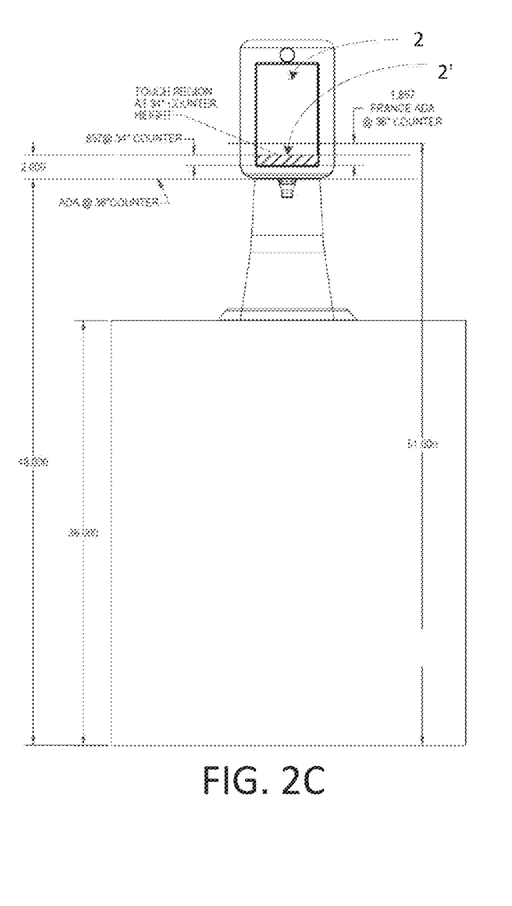

FIGS. 2(a)-2(b) show ADA requirements for the placement of accessible items to disabled persons depending on the height and set back on a particular countertop or surface. As previously discussed, while touch screens have made beverage dispensers much more customizable and user experience for most users much more interactive and enjoyable, disabled persons are sometimes limited in using touch screens because of the placement of the touch screens on the beverage dispenser tower. As seen in FIG. 2(a) the maximum height of an item to be accessed per ADA requirements is 48 inches on a 34 inch high countertop or surface when the item is placed at a maximum distance of 10 inches back from the edge of the surface. FIG. 2(a) shows the maximum height of an item to be accessed per ADA requirements is 46 inches on a 34 inch high countertop or surface when the item is set back at a maximum distance of farther than 10 inches and at a maximum distance of 24 inches set back from the front edge of the countertop or surface. FIG. 2(c) shows a typical arrangement for a touch screen 2 on a beverage dispensing tower 1 installed on a 34 inch countertop. As seen, only the lower portion of the touch screen is accessible to a disabled person per the ADA requirements. Thus, alternatives for accessibility, described further below, are desirable so that disabled person can control and dispense a beverage from a touch screen beverage dispenser 1.

While various alternatives are described herein, one embodiment provides for configurable buttons to be displayed on the lower portion of the touchscreen within the reachable region as an ADA accessible portion 2', such that a disabled person could control selecting and dispensing a beverage with only the lower portion ADA accessible portion 2' of touch screen 2.

ADA Enabled Touch Screen Beverage Dispensers

Figure 3:
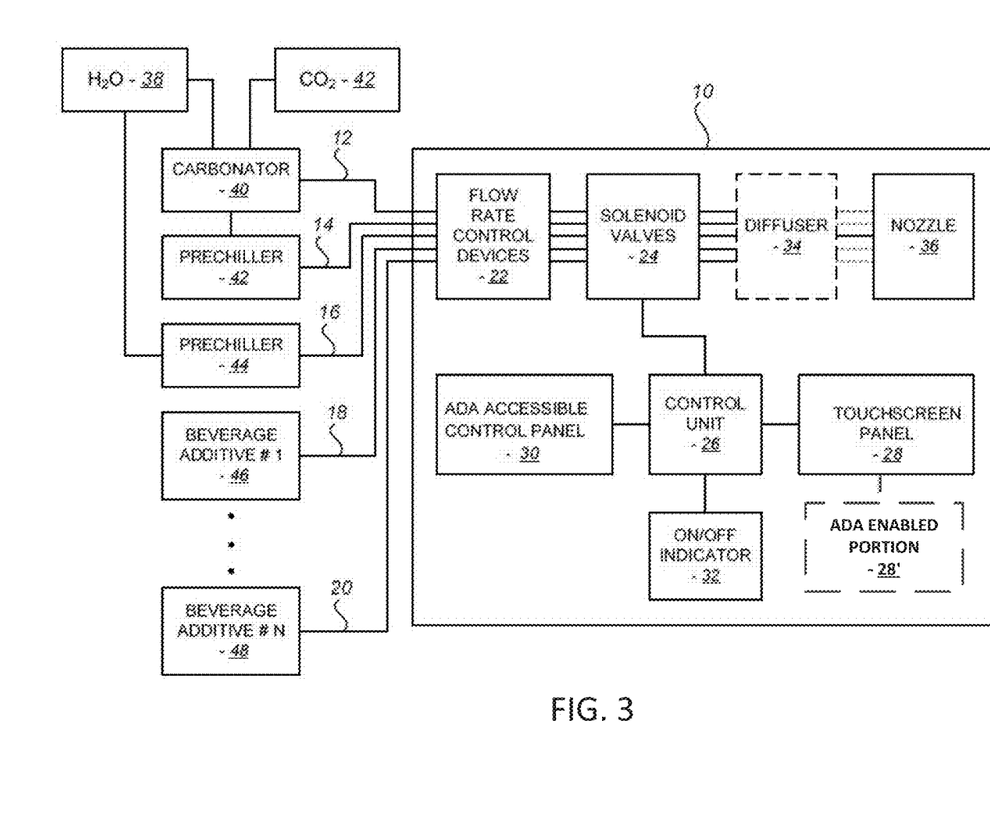
FIG. 3 diagrammatically illustrates a control system for the beverage dispenser of in accordance with many embodiments.

FIG. 3 diagrammatically illustrates an ADA enabled panel for a touch screen beverage dispenser 10, in accordance with many embodiments of the present invention. The beverage dispenser 10 receives a plurality of beverage fluids from a corresponding plurality of supply lines 12, 14, 16, 18, 20. The beverage dispenser 10 includes flow rate control devices 22, solenoid valves 24, a control unit 26, an ADA accessible key pad 3, touch screen 2, an on/off indicator 32, and a nozzle 36. The beverage dispenser can also include a diffuser 34, or other suitable beverage fluid distribution component for distributing beverage fluid(s) discharged from the solenoid valves 24 to the nozzle 36.

The supply lines 12, 14, 16, 18, 20 are in fluid communication with associated beverage fluid sources. The supply line 12 is in fluid communication with a water source 38 through a carbonator 40. The carbonator 40 is connected to a source of carbon dioxide ($CO_2$) 42 to carbonate the water supplied by the water source 38. The carbonated water can be directly supplied to the beverage dispenser 10 via the supply line 12, or it can be cooled by a prechiller 42 connected to the carbonator 40. Prechilled carbonated water is supplied to the beverage dispenser 10 via the supply line 14. The supply line 16 is in fluid communication with the water source 38 through a prechiller 44 and supplies chilled non-carbonated water to the beverage dispenser 10. The prechiller 44 can be omitted in some embodiments so that the supply line 16 provides water from the water source 38 directly to the beverage dispenser 10. The beverage dispenser 10 can also have a heater (not shown).

The flow rate control devices 22 can include a flow rate control device coupled with each of one or more of the supply lines 12, 14, 16, 18, 20. Each flow rate control device can be used to control the rate of flow of a beverage fluid communicated by one of the supply lines. Each of the flow rate control devices can be an adjustable device (e.g., an adjustable valve) configurable to provide a desired flow rate for the beverage fluid.

The solenoid valves 24 include a solenoid valve for each of the beverage fluid supply lines. Each of the solenoid valves 24 can be individually controlled to control the discharge of an associated beverage fluid. For example, one solenoid valve can be opened to discharge a quantity of carbonated water, and another solenoid valve can be opened to discharge an appropriate quantity of beverage additive. The discharged quantities of carbonated water and beverage additive can be mixed in the diffuser 34 and dispensed from the nozzle 36 as a mixed beverage. The discharged quantities can also be separately dispensed from separate discharge ports in the nozzle. Such separate dispensing may help to reduce cross contamination between beverage fluids.

The solenoid valves 24 are controlled by the control unit 26. The control unit 26 receives user input from the touch screen 2 and/or the ADA accessible key pad 3 and controls the solenoid valves to discharge quantities of one or more beverage fluids so as to dispense a selected beverage from the nozzle 36. The control unit 26 is also electrically coupled to the on/off indicator 32 and controls the on/off indicator 32 to indicate the on/off status of the beverage dispenser 10.

The beverage dispenser 10 is capable of receiving water from the water source 38, carbonated water from the carbonator 40, and/or one or more beverage additives from beverage additive sources 46, 48. A beverage additive can include flavorings or syrups such as, for example, tea flavorings, coffee flavorings, vitamin shots, sweetener shots, soft drink syrups, etc. One or more beverage additives can be transferred from the beverage additive sources 46, 48 to the beverage dispenser 10 by the supply lines 18, 20 (e.g., input tubing).

Water supplied to the beverage dispenser 10 can be supplied from any water source through input tubing. The water and/or the carbonated water can be circulated through the prechillers 42, 44 before being supplied to the beverage dispenser 10. The prechillers 42, 44 can be any suitable device for lowering the temperature of the water and/or the carbonated water supplied to the beverage dispenser 10. The prechillers 42, 44 can be incorporated into the beverage dispenser 10. The prechillers 42, 44 can be separate devices or integrated into a single device.

The beverage dispenser 10 can be configured to receive non-carbonated water and/or carbonated water. In order to receive carbonated water, the water supplied to the beverage dispenser 10 can have carbon dioxide ($CO_2$) added to it by the carbonator 40. The carbonator 40 can be any suitable device that is capable of dissolving carbon dioxide in water or any other liquid or aqueous solution. Carbonated water can be supplied directly to the beverage dispenser 10 by the carbonator 40 or, alternatively, the carbonated water can be circulated through the prechiller 42 before it is supplied to the beverage dispenser 10. The water can additionally or alternatively be circulated through the prechiller 42 before it is supplied to the carbonator 40. The carbonator 40 can be incorporated into the beverage dispenser 10 or, alternatively, the carbonator 40 can be a separate device. For purposes of illustration, both carbonated water and non-carbonated water are illustrated in FIG. 3 as being supplied to the beverage dispenser 10. However, supplying both carbonated and non-carbonated water is not required.

The beverage dispenser 10 can be capable of dispensing one or more beverage fluids used to make a beverage. As used herein, a "beverage fluid" refers to any fluid constituent of a beverage, for example, a beverage additive, water, carbonated water, various types of alcohol, or any other beverage fluid constituent. The beverage dispenser 10 can also be capable of dispensing a blended beverage by mixing one or more beverage additives with non-carbonated water and/or carbonated water. The beverage dispenser 10 can also be capable of dispensing a beverage that does not necessarily require mixing. For example, the beverage dispenser 10 can be capable of dispensing wine or beer. In addition, the beverage dispenser 10 can be capable of dispensing non-carbonated water or carbonated water.

Additionally, the beverage dispenser 10 can be capable of dispensing carbonated beverages by adding carbon dioxide to a blended beverage or by mixing carbonated water with a beverage additive. The beverage dispenser 10 can be implemented to dispense many different types of flavorings or beverage additives, flavored beverages, and blended beverages. For instance, different tea flavorings can be provided to the beverage dispenser 10 to create a variety of blended tea beverages. The beverage dispenser 10 can be used to dispense various flavorings and beverages, including but not limited to water, tea, coffee, juices, energy drinks, vitamin-fortified beverages, high fructose corn syrup beverages, or diet beverages.

The touch screen 28, ADA accessible portion of the touch screen 28', ADA accessible control panel 30 and beverage dispenser 10, as diagrammatically described and shown in FIG. 3, are synonymous to touch screen 2, ADA accessible portion of the touch screen 2', ADA accessible key pad 3 and beverage dispenser 1, as provided throughout the rest of the disclosure.

Touch Screen Operation

To operate a touch screen for dispensing a beverage like the one disclosed in Assignees prior application to Hecht, a user touches the touch screen 2, which causes a command signal to be sent to the control unit 26. In response to the received command signal, the control unit sends a new graphical configuration to the touch screen 2. The new graphical configuration is a beverage dispensing screen which includes a plurality of selectable options. The options may be configured as discernable buttons that indicate different kinds of beverages. In some exemplary configurations, eight discernable buttons are shown, although more or less may be used depending on the beverages available.

A "button" with respect to the touch screen 2 is intended to mean a zone on the touch screen which is predetermined to respond to a touch by a user. For example, the entirety of the touch screen 2 may be considered a button when the sleep mode is displayed, while only select portions of the beverage dispensing screen are considered buttons. Buttons may be discernable or non-discernable to a user.

Figure 4:
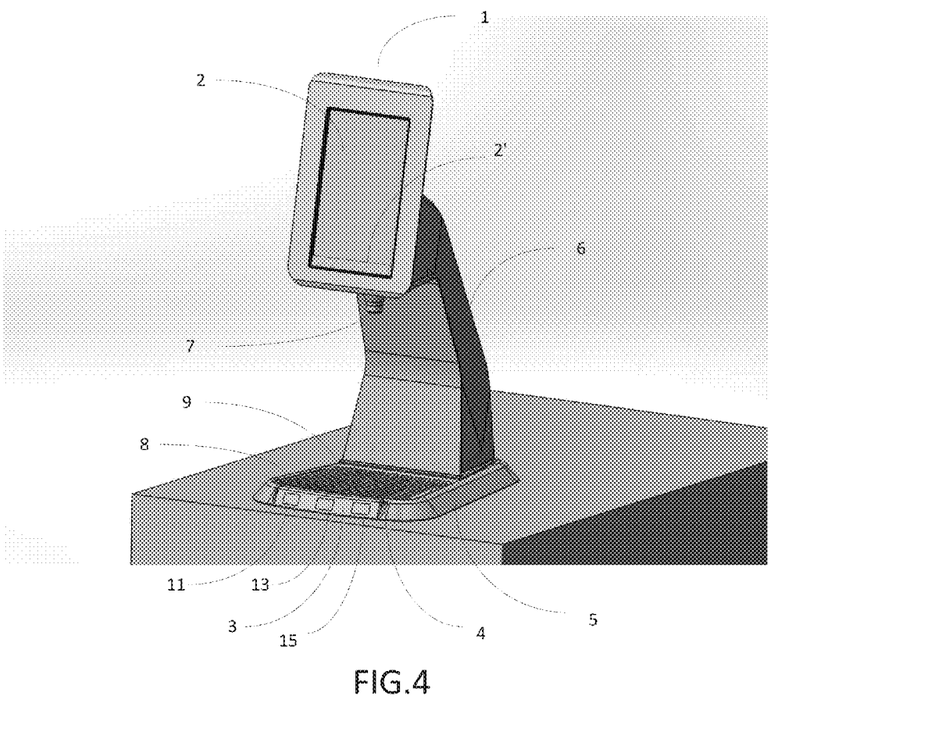
FIG. 4 illustrates an ADA enabled beverage dispenser, in accordance with many embodiments of the present invention and a second way to ADA compliance by providing separate electromechanical inputs as an interface.

The control unit receives a signal indicating that the user has selected one of the discernable buttons for dispensing a type of beverage. The user may select a desired beverage type by physically placing a body part, such as a finger, against one of the discernable buttons. One embodiment for providing ADA accessibility is to provided ADA accessible buttons on an ADA accessible portion 2' on the lower portion of touchscreen 2. FIG. 4, described in further detail below, shows this embodiments for providing an accessible ADA interface.

A disabled person cannot always reach the touch screen, or the lower portion to provide the necessary physical input to the system, and thus an ADA accessible key pad, described and shown in FIG. 4, below, can be provided to allow for further controls for a disabled person.

Examples of ADA Accessible Key Pad

FIG. 4 illustrates an exemplary ADA enabled beverage dispenser 1 with an accessible key pad 3, according to embodiments of the invention. FIG. 4 also illustrates an ADA accessible portion 2' of the touch screen 2 in the lower portion of the touch screen 2, that can be configured to provide buttons for controlling dispensing of a beverage within the reach of a disabled person as illustrated in FIG. 2C. The ADA accessible portion 2', can be configured with buttons in the similar way as the rest of the touch screen 2 is configured in that when a user selects configured buttons on the ADA accessible portion 2' the user can select and/or dispense a beverage from the beverage dispenser. The configured buttons within the ADA accessible portion 2' can include up, down, left right, select and dispense buttons or any combination thereof among other buttons and configurations.

In addition to the touch screen 2, and ADA accessible portion 2' the beverage dispenser 1 can have a key pad 3 made up of one or more buttons that are located so that they are accessible to disabled persons under the ADA requirements. In this particular embodiment, three buttons are shown on the base 5 of the beverage dispenser 1, near the front of the base 5 and below the touch screen 2. The buttons are shown equally spaced and centered along the base but multiple other configurations for the buttons on the beverage dispenser base are possible.

The beverage dispenser 1 has a base 5 that sits on a countertop or other suitable surface. The base 5 supports a tower 6, which supports the touch screen 2. The tower 5 extends upward and bends forward. At the top of the tower 6 on its under portion, a nozzle 7 extends downward from the tower 6. The tower 6 and nozzle 7 are configured so that a beverage container (not shown) can be placed under the nozzle 7 for dispensing a beverage into the container. The touch screen 2 is installed above the nozzle 7 facing outward towards a user so the user can read and interact with the touch screen 2 by physically touching the touch screen 2.

A drip pan 8 and screen 9 are located in the base 5 under the nozzle 7 to catch and collect any overspray or excess beverage that is not dispensed into a beverage container. An ADA accessible key pad 3 is arranged on the base front 4 of the beverage dispenser 1. The key pad 3 faces outward similar to the touch screen 2 so a user can interact with and physically manipulate the key pad 3. In this particular embodiment, the key pad 3 has three buttons; a left 11 toggle button, a selector button 13 and a right toggle button 15. The buttons are equally spaced apart from each other and are centered on the base front 4, but the key pad 3 and buttons can be arranged in a variety of different configurations depending on the desirability of the establishment utilizing the beverage dispenser 1. The key pad 3 is located on the base 5 below the touch screen 2 and within proximity of the surface that the beverage dispenser 1 is installed, placing the buttons within the accessible reach of disabled persons and allowing the beverage dispenser 1 to be ADA complaint when proper installed.

Figure 5A:
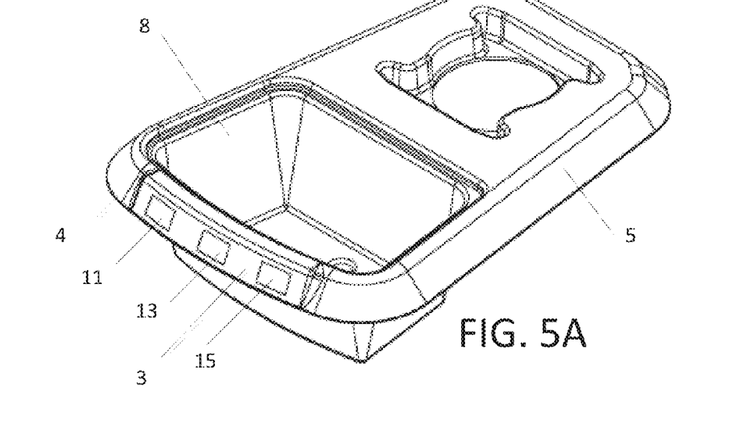
FIG. 5A shows the base portion of the beverage dispenser of FIG. 4, with the keypad and buttons.
Figure 5B:
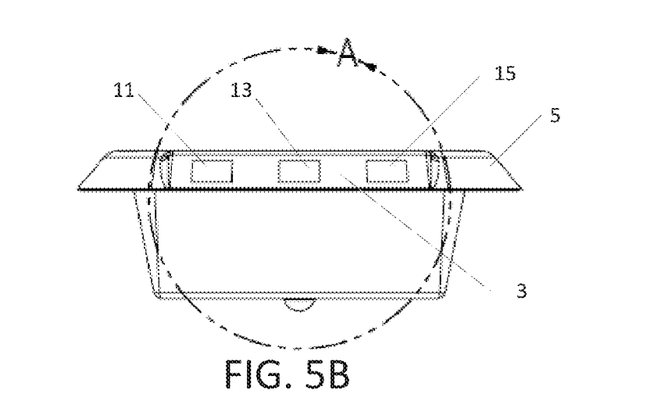
FIG. 5B shows a front view of the beverage dispenser of FIG. 5A.
Figure 5C:
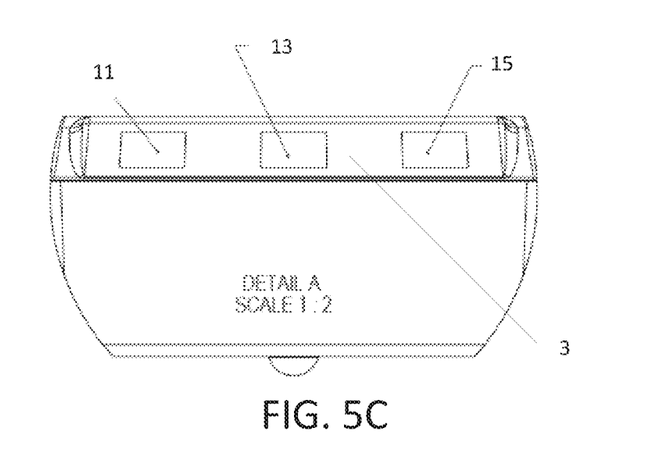
FIG. 5C shows a detail view of FIG. 5B further illustrating the three buttons of the key pad.

FIG. 5A shows the base 5 of the beverage dispenser 1 of FIG. 4. FIG. 5B shows a front view of the beverage dispenser 1 of FIG. 5A and FIG. 5C shows a detail view of FIG. 5B. Here, the left toggle button 11, selector button 13 and right toggle button 15 of the key pad 3 are seen disposed on the base front 4 in front of drip pan 8.

A key pad can have an alternative configuration with a left toggle button then a right toggle button, followed by a selector button and a beverage dispensing button, from left to right.

An alternative exemplary configuration can also have a left toggle button then a selector button followed by a right toggle button, and a beverage dispensing button, from left to right. The key pad can also have a flexible cover with button identification marks that rests over sensors that act as the buttons. Multiple other configurations for the buttons on the beverage dispenser 1 base is possible including use of an additional touch screen interface in place of buttons on the base front 4.

Figure 6:
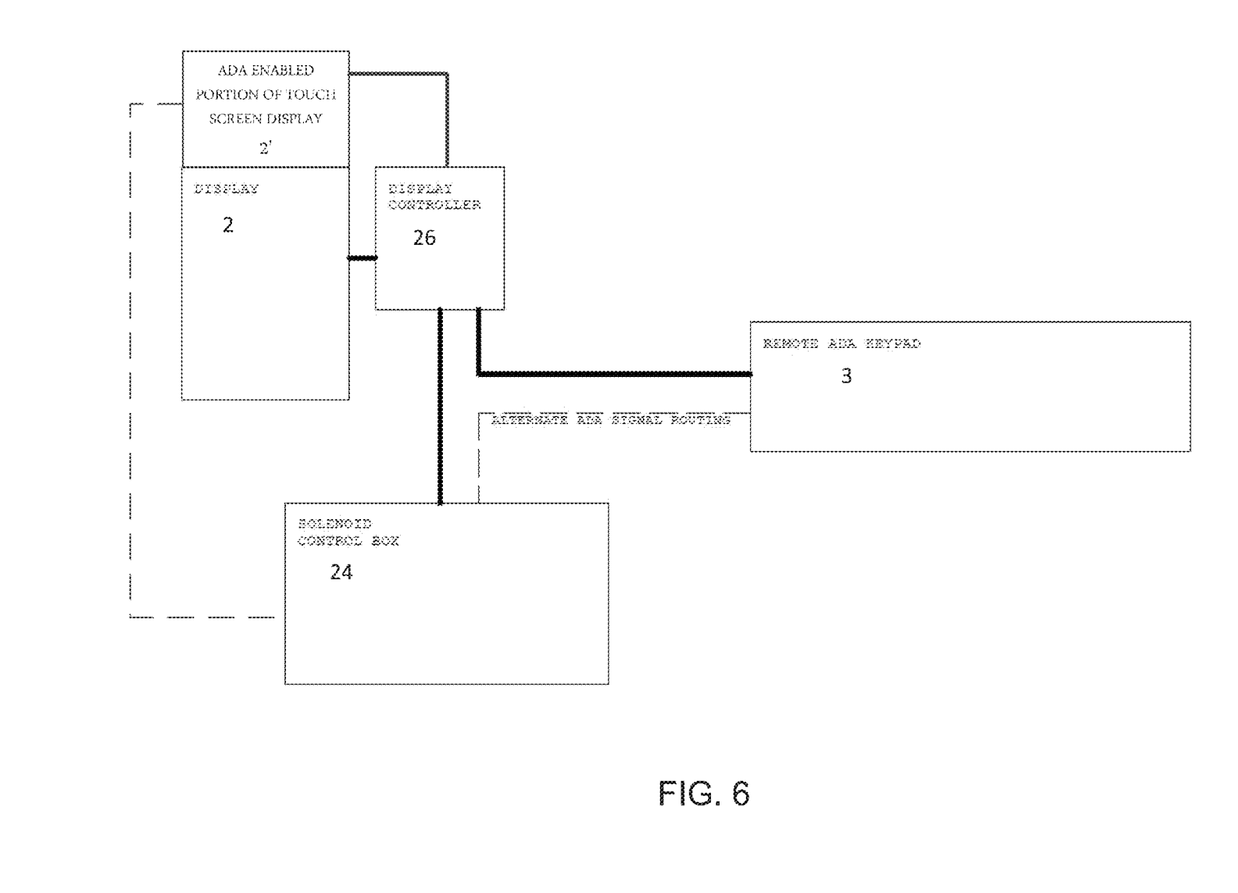
FIG. 6 diagrammatically illustrates a control system for an ADA enabled touch screen beverage dispenser in accordance with many embodiments of the present application.

FIG. 6 diagrammatically illustrates a control system for an ADA enabled panel for a touch screen beverage dispenser 1 in accordance with many embodiments of the present invention. The touch screen 2, including the ADA enabled portion 2'. is electrically coupled to a controller 26 as provided in FIG. 3. The controller or control unit 26 is electrically coupled to the ADA accessible key pad 3 so that input from the ADA accessible key pad 3 can be communicated to the touch screen 2 via the control unit 26. An alternative embodiment is also shown with the dashed line where the ADA accessible key pad may be directly electrically communicated to the control unit 26 for dispensing a beverage, and thus the control unit can receive input from various sources. The control unit 26 is also electrically coupled to the solenoid valves and control for dispensing a beverage as dictated by the inputs of the ADA accessible key pad 2 and/or the touch screen 2.

ADA Accessible Key Pad Operation

To operate the ADA accessible key pad 3 for dispensing a beverage like the one disclosed herein, a user physically touches one of the buttons on the key pad 3 given the users selection of options as displayed on the touch screen 2. This causes a command signal to be sent to the control unit 26. The control unit can interpret the input received from the key pad 3 in conjunction with the options displayed on the touch screen 2. In response to the received command signal, the control unit can dispense a beverage, if that was the selected option, or it may send a new graphical configuration to the touch screen 2. The new graphical configuration can be an additional beverage dispensing screen which includes further options.

Alternatively, as described in some embodiments and shown in FIG. 6, the ADA accessible key pad 3 may send a direct command signal to the control unit 26 and the control unit 26 can interpret this command without the need of the touch screen 2 information and can simply dispense a beverage or perform whatever other respective input is provided by the ADA accessible key pad 3.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. A recitation of "a", "an" or "the" is intended to mean "one or more" unless specifically indicated to the contrary. Many variations of the disclosure will become apparent to those skilled in the art upon review of the disclosure. One or more features from any embodiment described herein may be combined with one or more features of any other embodiment without departing from the scope of the disclosure. The scope of the disclosure should, therefore, be determined not with reference to the above description, but instead should be determined with reference to the pending claims along with their full scope or equivalents.

What is claimed is:

1. An accessible beverage dispenser comprising:
   a base for receiving a beverage container;
   a tower extending upward from the base such that the base supports the tower;
   a nozzle provided above the base for dispensing a beverage based on a user input, wherein the base, the tower and the nozzle define a housing for receiving a beverage container;
   a touch screen for receiving the user input for controlling the beverage dispenser, wherein the tower supports the touch screen;
   an accessible key pad panel located within the reach of a user in a wheelchair for receiving the user input, wherein the accessible key pad panel is provided on a front portion of the base below a bottom of the housing and below a rim of the base, wherein the front portion of the base faces outward toward the user in the wheelchair; and
   an accessible touch screen panel displayed in a lower portion of the touch screen and within the reach of the user in the wheelchair for receiving the user input, wherein the accessible key pad panel and the accessible touch screen panel are configured to communicate with a control unit to control the beverage dispenser.

2. The beverage dispenser of claim 1, wherein the key pad panel is a touch screen.

3. The beverage dispenser of claim 1, further comprising:
   a drip pan housed in the base and located under the nozzle, wherein the first accessible panel is provided on a front surface of the drip pan, the front surface of the drip pan facing outward toward the user in the wheelchair.

4. The beverage dispenser of claim 1, wherein the accessible touch screen panel includes one or more buttons.

5. The beverage dispenser of claim 4, wherein the one or more buttons include an up button, a down button, a left button, a right button, a select button or a dispense button.

6. The beverage dispenser of claim 1, wherein the accessible key pad panel is comprised of one or more buttons.

7. The beverage dispenser of claim 6, wherein the one or more buttons are a right toggle button, a left toggle button and a selector button.

8. The beverage dispenser of claim 7, wherein the one or more buttons further comprise a beverage dispensing button.

9. A control system for a beverage dispenser, having a housing and a base with touch screen user interface, the control system comprising:
   a touch screen attached to a beverage dispensing end of the beverage dispenser for receiving input for controlling the beverage dispenser;
   an accessible key pad panel located on a front portion of the base below a bottom of the housing and below a rim of the base, wherein the front portion of the base faces outward toward a user in a wheelchair such that the first accessible panel is within the reach of the user in the wheelchair for receiving input from the user;
   an accessible touch screen panel for receiving input from the user displayed in a lower portion of the touchscreen and within the reach of the user in the wheelchair; and
   a control unit electrically coupled to each of the accessible key pad panel and the accessible touch screen panel, the control unit configured to:
      send a first graphical configuration to the touch screen for display;
      receive a first command from the touch screen, the accessible key pad panel or the accessible touch screen panel;
      send a second graphical configuration to the touch screen for display in response to the first command;
      receive a second command from the touch screen, the accessible key pad panel or the accessible touch screen panel with respect to the second graphical configuration; and
      control the beverage dispenser in response to the second command.

10. The system of claim 9, wherein the control unit is configured to receive input from various sources.

11. The system of claim 9, wherein the first command is derived from receiving a user touch on one of the accessible key pad panel or the accessible touch screen panel.

12. The system of claim 11, wherein the second command is derived from receiving a user selection of one of the commands from the accessible key pad panel or the accessible touch screen panel.

* * * * *